(12) United States Patent
Lutz

(10) Patent No.: US 9,823,897 B2
(45) Date of Patent: *Nov. 21, 2017

(54) APPARATUS AND METHOD FOR FLOATING-POINT MULTIPLICATION

(71) Applicant: ARM LIMITED, Cambridge (GB)

(72) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 147 days.

This patent is subject to a terminal disclaimer.

(21) Appl. No.: 14/865,342

(22) Filed: Sep. 25, 2015

(65) Prior Publication Data

US 2017/0090868 A1    Mar. 30, 2017

(51) Int. Cl.
   *G06F 7/44*     (2006.01)
   *G06F 7/487*    (2006.01)
   *G06F 5/01*     (2006.01)

(52) U.S. Cl.
   CPC .............. *G06F 7/487* (2013.01); *G06F 5/012* (2013.01)

(58) Field of Classification Search
   CPC ................................ G06F 7/487; G06F 5/012
   USPC ........................................................ 708/503
   See application file for complete search history.

(56) References Cited

U.S. PATENT DOCUMENTS

| | | | |
|---|---|---|---|
| 6,490,607 B1 * | 12/2002 | Oberman | G06F 7/53 708/498 |
| 8,996,600 B1 | 3/2015 | Langhammer | |
| 2011/0106868 A1 | 5/2011 | Lutz | |

FOREIGN PATENT DOCUMENTS

WO    WO 98/06029    2/1998

OTHER PUBLICATIONS

U.S. Appl. No. 14/865,359, filed Sep. 25, 2015, Inventor: Lutz.
UK Combined Search and Examination Report dated Nov. 24, 2016 in GB 1610092.7, 5 pages.
UK Combined Search and Examination Report dated Nov. 24, 2016 in GB 1610091.9, 6 pages.

(Continued)

*Primary Examiner* — Tan V. Mai
(74) *Attorney, Agent, or Firm* — Nixon & Vanderhye P.C.

(57) ABSTRACT

An apparatus and method for floating-point multiplication are provided. Two partial products are generated from two operand significands. An unbiased result exponent is determined from operand exponent values and leading zero counts, and a shift amount and direction for a product significand as needed for a predetermined minimum exponent value of a predetermined canonical format. First and second rounding values for injection into addition of the partial products are generated by shifting a predetermined rounding pattern by the shift amount in an opposite shift direction for the first rounding value and left shifting by one bit the first rounding value to give the second. The first and second partial products are added together with the first rounding value to give a first product significand, and are added together with the second rounding value to give a second product significand. These product significands are shifted by the shift amount in the shift direction and one is then selected in order to generate a formatted significand in the predetermined canonical format. The early injection rounding provides a faster floating-point multiplier.

21 Claims, 12 Drawing Sheets

(56) References Cited

OTHER PUBLICATIONS

A.F. Tenca et al, "Performance Impact of Using Denormalized Numbers in Basic Floating-point Operations" Conference record of the Forty-First Asilomar Conference on Signals, Systems & Computers, 2007, Nov. 4-7, 2007, pp. 348-352.
Office Action dated May 5, 2017 in co-pending U.S. Appl. No. 14/865,359, 10 pages.

* cited by examiner

FIG. 1A

| prod[47:0] | 47 | 46 | 45 | ... | 25 | 24 | 23 | 22 | 21 | ... | 0 |
|---|---|---|---|---|---|---|---|---|---|---|---|
| A. normal inputs [1, 2) | | i | f | ... | f | f | L | G | s | ... | s |
| B. ovfl normal inputs [2, 4) | i | f | f | ... | f | L | G | s | s | ... | s |

FIG. 1B

| prod[47:0] | 47 | 46 | 45 | 47-k | ... | 24-k | 23-k | 22-k | ... | 0 |
|---|---|---|---|---|---|---|---|---|---|---|
| C. subnormal input (0, 1) | | | | i | ... | f | f | L | G | s | ... | s |
| D. ovfl sub. input (0, 1) | | | | i | f | ... | f | L | G | s | s | ... | s |

APPARATUS AND METHOD FOR FLOATING-POINT MULTIPLICATION

TECHNICAL FIELD

The present disclosure relates to a data processing apparatus. More particularly, it relates to floating-point multiplication in a data processing apparatus.

BACKGROUND

Floating-point multiplication capability may be provided in a data processing apparatus. The floating-point format for numbers is useful to be supported, in particular in view of the large range of values which it is able to represent. Accordingly, a data processing apparatus may be provided with a floating-point multiplier which is specifically provided for the purpose of handling the multiplication of such floating-point values. Various aspects of the implementation of such a floating-point multiplier are nevertheless non-trivial, especially if the multiplier is to operate quickly and efficiently, and these complexities are greater the more flexibility is allowed in the representation of an operand for the floating-point multiplication which the multiplier receives. For example, the construction of the floating-point multiplier may be simplified by constraining the representation of input operands to normalised inputs, yet more generally the floating-point values which a data processing apparatus is required to handle will not necessarily conform to this normalised representation and therefore additional capability in the input stages of the multiplier then needs to be provided to convert non-normalised inputs into a normalised representation. It would be desirable to provide an improved technique for handling floating-point multiplication in a data processing apparatus.

SUMMARY

At least one embodiment provides an apparatus for floating point multiplication comprising partial product generation circuitry to multiply significands of a first floating-point operand and a second floating-point operand to generate first and second partial products; exponent calculation circuitry to calculate a value of an unbiased exponent of a result of the multiplication in dependence on exponent values and leading zero counts of the first and second floating-point operands and to determine a shift amount and a shift direction for a product significand generated by an addition operation on the first and second partial products, in dependence on a predetermined minimum exponent value of a predetermined canonical format; rounding injection circuitry to generate first and second rounding values for injection into the addition operation, wherein the rounding injection circuitry comprises rounding shift circuitry to generate the first rounding value by shifting a predetermined rounding pattern by the shift amount in an opposite direction to the shift direction and to generate the second rounding value by left shifting by one bit the first rounding value; first adder circuitry to add the first and second partial products together with the first rounding value for the addition operation to generate a first product significand; second adder circuitry to add the first and second partial products together with the second rounding value for the addition operation to generate a second product significand; significand shift circuitry to shift at least one of the first and second product significands by the shift amount in the shift direction; and selection circuitry to select one of the first and second product significands in order to generate a formatted significand in the predetermined canonical format.

At least one embodiment provides an apparatus for floating-point multiplication comprising means for multiplying significands of a first floating-point operand and a second floating-point operand to generate first and second partial products; means for calculating a value of an unbiased exponent of a result of the multiplication in dependence on exponent values and leading zero counts of the first and second floating-point operands and for determining a shift amount and a shift direction for a product significand generated by an addition operation on the first and second partial products, in dependence on a predetermined minimum exponent value of a predetermined canonical format; means for generating first and second rounding values for injection into the addition operation, wherein the means for generating first and second rounding values comprises means for generating the first rounding value by shifting a predetermined rounding pattern by the shift amount in an opposite direction to the shift direction and means for generating the second rounding value by left shifting by one bit the first rounding value; means for adding the first and second partial products together with the first rounding value for the addition operation to generate a first product significand; means for adding the first and second partial products together with the second rounding value for the addition operation to generate a second product significand; means for shifting at least one of the first and second product significands by the shift amount in the shift direction; and means for selecting one of the first and second product significands in order to generate a formatted significand in the predetermined canonical format.

At least one embodiment provides a method of operating a data processing apparatus to perform floating-point multiplication comprising multiplying significands of a first floating-point operand and a second floating-point operand to generate first and second partial products; calculating a value of an unbiased exponent of a result of the multiplication in dependence on exponent values and leading zero counts of the first and second floating-point operands and determining a shift amount and a shift direction for a product significand generated by an addition operation on the first and second partial products, in dependence on a predetermined minimum exponent value of a predetermined canonical format; generating first and second rounding values for injection into the addition operation, wherein generating the first and second rounding values comprises generating the first rounding value by shifting a predetermined rounding pattern by the shift amount in an opposite direction to the shift direction and generating the second rounding value by left shifting by one bit the first rounding value; adding the first and second partial products together with the first rounding value for the addition operation to generate a first product significand; adding the first and second partial products together with the second rounding value for the addition operation to generate a second product significand; shifting at least one of the first and second product significands by the shift amount in the shift direction; and selecting one of the first and second product significands in order to generate a formatted significand in the predetermined canonical format.

BRIEF DESCRIPTION OF THE DRAWINGS

The present techniques will be described further, by way of example only, with reference to embodiments thereof as illustrated in the accompanying drawings, in which:

FIG. 1A shows bit positions within the product significand when both input operands are normal for the case where the product significand is within range and for the case where the product significand overflows in one embodiment;

FIG. 1B shows bit positions within the product significand in the case where one of the operands is sub-normal for the case where the product significand is within range and for the case where the product significand overflows in one embodiment;

DESCRIPTION OF EXAMPLE EMBODIMENTS

Figure 2:
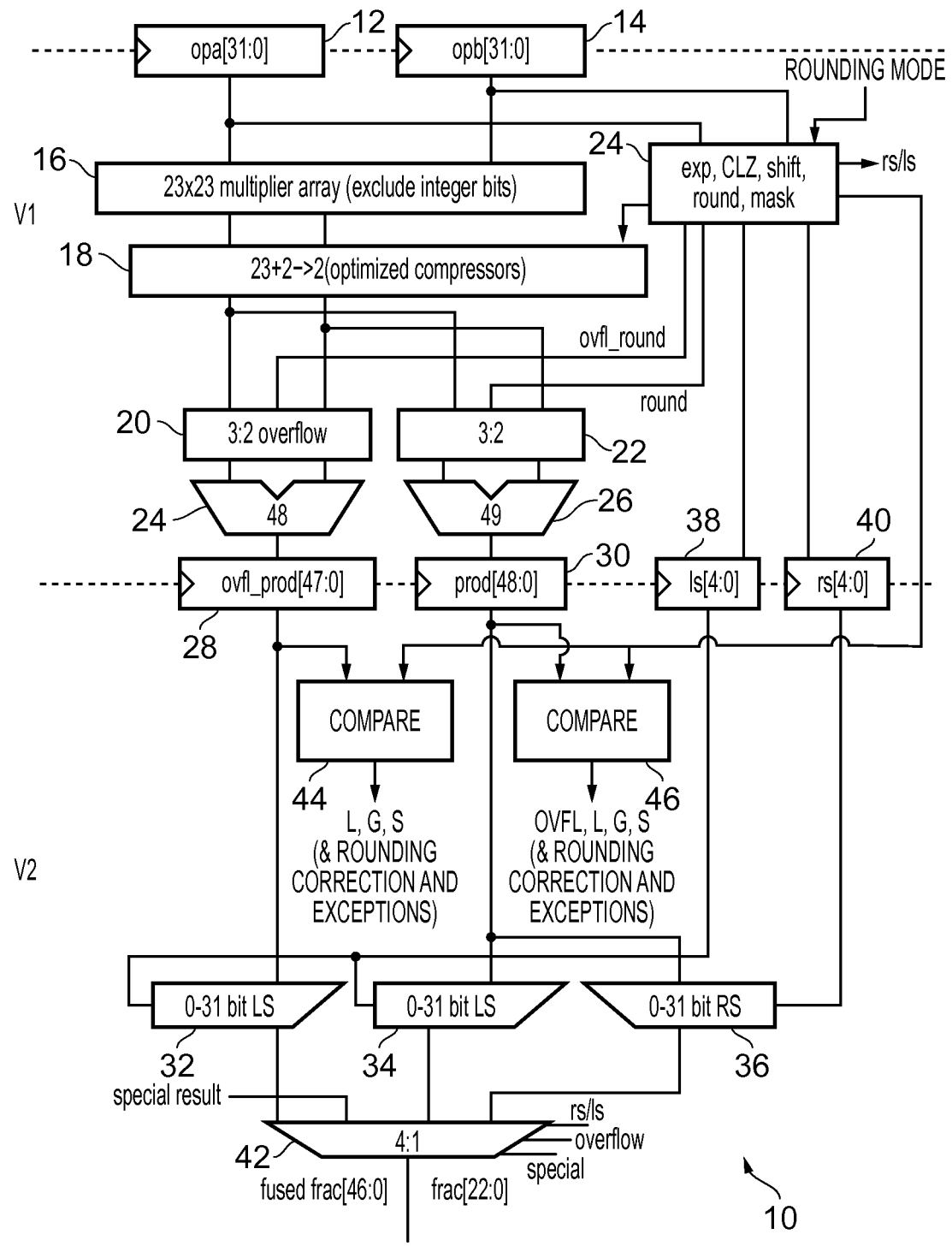
FIG. 2 schematically illustrates apparatus for floating-point multiplication in one embodiment.

At least some embodiments provide an apparatus for floating point multiplication comprising partial product generation circuitry to multiply significands of a first floating-point operand and a second floating-point operand to generate first and second partial products; exponent calculation circuitry to calculate a value of an unbiased exponent of a result of the multiplication in dependence on exponent values and leading zero counts of the first and second floating-point operands and to determine a shift amount and a shift direction for a product significand generated by an addition operation on the first and second partial products, in dependence on a predetermined minimum exponent value of a predetermined canonical format; rounding injection circuitry to generate first and second rounding values for injection into the addition operation, wherein the rounding injection circuitry comprises rounding shift circuitry to generate the first rounding value by shifting a predetermined rounding pattern by the shift amount in an opposite direction to the shift direction and to generate the second rounding value by left shifting by one bit the first rounding value; first adder circuitry to add the first and second partial products together with the first rounding value for the addition operation to generate a first product significand; second adder circuitry to add the first and second partial products together with the second rounding value for the addition operation to generate a second product significand; significand shift circuitry to shift at least one of the first and second product significands by the shift amount in the shift direction; and selection circuitry to select one of the first and second product significands in order to generate a formatted significand in the predetermined canonical format.

The present techniques recognise that an improved apparatus for floating-point multiplication is provided, in particular in terms with the speed with which it is able to generate the product of two input floating-point operands, even if there is no constraint placed on the format in which the input operands are received (in particular that they need not be normalised), by arranging the apparatus to perform injection rounding early in the multiplication process, at a stage where it is not yet definitively known where the injection rounding within the product significand should take place (i.e. at which bit position). Essentially this is because at early stages of the multiplication it is not yet known where the leading bit of the product will be, yet the present techniques recognise that it is possible to compute the location to within one bit position. Based on this recognition, the present techniques provide rounding injection circuitry which constructs two rounding constants for the injection rounding, which are then respectively used for injection rounding in two adder circuits, wherein one adder circuit is provided to handle a product significand in which overflow does occur (and hence the leading bit of the product will be one bit position higher) and the other adder circuit is provided to handle a product significand when overflow (purely from the addition of the first and second partial products) does not occur (and hence the leading bit position of the product will be one position lower than in the overflow case). However, in addition to this one-bit uncertainty about the position of the leading bit of the significand product, the form of the input operands also plays a significant role in determining the appropriate bit position at which the injection rounding should take place. This is due to the fact that if both inputs are normal then the unrounded product will present a leading bit which is either in the most significant bit position of the product significand format (which allows for overflow) or at one bit position below this (when overflow does not occur). However, when one of the input operands is sub-normal, i.e. having a number of leading zeros, then there will correspondingly be that number of leading zeros in non-overflow products and one less than that number of leading zeros in overflow products. Note that in the case that both input operands are sub-normal then this will produce an unrepresentably small product and the output value generated will not depend on the values of the input operands, but is determined purely by the rounding mode.

In this context then, in order to generate the first and second rounding values which will be injected into the addition operation carried out by the first and second adder circuitry respectively, the present techniques provide exponent calculation circuitry which examines the exponent values of the two input operands and determines their respective leading zero counts, in order to determine a shift amount and direction which will result in the result of the multiplication being presented in the desired predetermined canonical format (for example normalised, where possible and using a biased exponent value such as is usual when generating floating-point values according to the IEEE 754-2008 FP standard). On the basis of this determined shift amount and direction for the product significand, the rounding injection circuitry generates the first and second rounding values by shifting a predetermined rounding pattern by the shift amount in an opposite direction to the shift direction. The second rounding value is generated by left shifting by one bit the first rounding value. In other words, a base rounding injection is determined (i.e. the injection that would apply to the case of a product significand which does not require shifting in order to be presented in the predetermined canonical format) and it is then shifted in the opposite direction with the same magnitude of the subsequently required significand shift. This allows the rounding injection to be added to the unshifted significand with the rounding occurring in the correct place. Notably, this enables the rounding injection to take place early in the multiplication process, such that following the addition of the first and second partial products by the first and second adder circuitry, the shift which has been determined to be required can be applied by the significand shift circuitry to generate the required formatted significand in the predetermined canonical format, without a rounding injection being required to be performed thereafter.

The first adder circuitry and second adder circuitry may take a variety of forms, but in one embodiment the first adder circuitry has a configuration to generate the first product significand with one less bit than the second product significand generated by the second adder circuitry. In other words, the maximum bit width supported by the first adder circuitry may be one less bit than that supported by the second adder circuitry. The provision of this particular arrangement is based on the recognition that the sum of the first and second partial products will have a fixed maximum bit width which is the same for both adders, but the introduction of the second rounding value (generated by left shifting by one bit the first rounding value) could cause a carry into an additional (higher) bit position in some cases for the second adder circuitry). Whilst both the first and second adder circuitry could be provided to be essentially identical, and configured to handle the same bit width which would allow for such a carry, a reduction in the area (i.e. number of gates) required to provide the first adder circuitry is achieved by this embodiment.

The predetermined rounding pattern may take a variety of forms, in particular in dependence on the type of rounding which should be applied to the multiplication operation. In some embodiments the predetermined rounding pattern has a length matching the formatted significand, and comprises a set bit followed by unset bits when a rounding mode of the apparatus is round-to-nearest ties-to-even (RNE), and comprises all set bits when the rounding mode is round-up (RU), and when the opposite direction is left and the rounding mode is round-up, a number of less-significant bit positions are set given by the shift amount, and when the opposite direction is right, a number of most-significant bit positions are unset given by the shift amount. Thus, for example in the case of an apparatus configured to perform floating-point multiplication on single precision (SP) floating-point numbers in the IEEE 754-2008 format having 23 fraction bits, the predetermined rounding pattern is then a one followed by 22 zeros (for RNE rounding) or a one followed by 22 further ones (for RU rounding). If the product significand needs to be right shifted, then the rounding constant is left shifted, with bits on the right replaced by RU bits (i.e. ones if rounding up) and the left shifted rounding constant becomes a 48-bit value. Conversely if the product significand is to be left shifted, then the rounding constant (starting as a predetermined rounding pattern) is right shifted with bits on the left replaced by zeroes. The right shifted rounding constant remains a 23-bit value.

In the light of the above discussion it will be clear that a determination of whether a product significand generated by addition of the two partial products has overflowed is useful in order to finally determine certain bit positions within the product significand, the values of which are required to determine its final output form. Moreover, whilst a determination of this overflow status could be determined by examining the product significand after the shift circuitry has shifted it, and then checking whether a most significant bit (for example bit 47 in the case of a SP multiplier) has been set, the present techniques provide that this overflow identification can happen faster by the use of an overflow mask, which identifies the overflow bit position by being generated from a predetermined mask pattern which is right shifted by the shift amount and then applied to the unshifted second product significand. Accordingly, in some embodiments the apparatus comprises mask generation circuitry to generate an overflow mask identifying an overflow bit position of the second product significand, wherein the mask generation circuitry is arranged to generate the overflow mask by right shifting a predetermined mask pattern by the shift amount; and comparison circuitry to apply the overflow mask to the second product significand to extract an overflow value at the overflow bit position, wherein the comparison circuitry is arranged to extract the overflow value before the significand shift circuitry shifts at least one of the first and second product significands. In this manner the overflow value is determined significantly earlier than it would be by the above-mentioned technique of first shifting the product and thereafter checking whether the most significant bit is set. This then means that the final result of the multiplication can be selected as soon as the shifting completes, since the overflow value is already available.

The predetermined mask pattern may take a variety of forms, but in one embodiment the predetermined mask pattern comprises a set bit at an unshifted overflow bit position of the second product significand when the second product significand is unshifted. Thus this "set bit" may be identified and tracks the overflow bit position within the second product significand both before shifting and then when the right shift is applied to the predetermined mask pattern, enabling the overflow bit position to be identified before any required shift to the second product significand is applied.

It will be understood that it will generally be as a result of a left shifted product significand that overflow can result, yet the present techniques further recognise that right shifted product significands can overflow into normal space in certain circumstances. Accordingly in some embodiments the exponent calculation circuitry comprises right shift overflow determination circuitry to identify a right shift overflow condition when the shift direction is right, and either a most significant bit of the second product significand is set and the shift amount is two; or a most-significant-but-one bit of the second product significand is set and the shift amount is one; and the exponent calculation circuitry is responsive to the right shift overflow condition to set a value of a biased exponent of the result of the multiplication to one. In other words, it is recognised that overflow can be directly identified for these two explicit situations, namely when a most significant bit of the second product significand is set and the shift amount is two, or when a most-significant-but-one bit of the second product significand is set at the right shift amount is one. Thus, in both of these right shift overflow cases the biased exponent of the result will be set to one. Note that all other right shifts have a biased exponent of zero.

The significand shift circuitry may take a variety of forms, but in one embodiment comprises: left shift circuitry to left shift the first and second product significands by the shift amount to give first and second left-shifted product significands; right shift circuitry to right shift the second product significand by the shift amount to give a right-shifted product significand, wherein the left shift circuitry and the right shift circuitry are arranged to perform their respective shifting in parallel with one another; and the selection circuitry is responsive to the shift direction and the overflow value to select as the formatted significand one of the first left-shifted product significand, the second left-shifted product significand and the right-shifted product significand, and to select a predetermined number of most significant bits in the formatted significand to output. Accordingly, although it would also be possible to provide generic significand shift circuitry which could either left shift or right shift either the first or second product significand as required, the present techniques provide dedicated left shift circuitry and dedicated right shift circuitry which are arranged to perform their respective shifts in parallel with one another, such that the first and second product significands are left shifted and the second product significand is right shifted in parallel, and the subsequent selection circuitry then selects one of the results of these three shifts. This selection is made in dependence on the identified shift direction and the overflow value, i.e. the overflow value enables a selection between the first and second left shifted product significands to be made and the shift direction enables a selection between the left shifted or right shifted product significands to be made. Further, the selection circuitry can output a predetermined number of most significant bits in the formatted significand, which may then reduce the number of bits of the significand, such as in the example of outputting a SP floating-point value where the rounded significand has 23 bits, but the first and second product significands have 48 and 49 bits respectively, but any other number of bits from within the selected shifted product significand can also be made.

For example, the floating-point multiplication may form part of a fused multiply-add operation, and accordingly in one embodiment the first and second rounding values are set to zero and the apparatus has a configuration to forward an unrounded result of the multiplication to an adder as part of a fused multiply-add. In other words, by means of this technique the rounding injection is suppressed and the formatted significand may then for example comprise all available bits of the product significand appropriate for providing to the adder with as great a precision as is available.

When performing injection rounding, there are situations in which a correction is required for certain sums when the rounding is being performed in RNE (rounds-to-nearest, ties-to-even) mode. In order to determine this correction the values of the last (L) bit of the formatted significand, as well as the guard (G) bit which follows this, and the set of sticky (S) bits which follow that, are required. In order to enable these values to be determined early, such that the above discussed advantages of rounding being able to be performed faster are not then lost by virtue of the corrections to that rounding only being able to be performed after the L, G and S values have been determined after the significand product has been shifted, the present techniques can further provide that the mask generation circuitry can generate a last bit mask which enables the last bit position to be found before the shifting takes place and hence the last bit value can then also be determined prior to that shifting taking place.

Accordingly, in some embodiments the mask generation circuitry is arranged to generate a last bit mask identifying a last bit position of a last bit of the formatted significand within the first product significand and wherein the mask generation circuitry is arranged to generate the last bit mask comprising shifting a predetermined last bit mask pattern by the shift amount in an opposite direction to the shift direction, and further comprising comparison circuitry to apply the last bit mask to the first product significand to extract a last bit value at the last bit position. In other words, where the exponent calculation circuitry determines that a left shift is required for the product significand of a given number of bits, the mask generation circuitry right shifts the last bit pattern by the same number of bits. Conversely, where a right shift is determined to be required by the exponent calculation circuitry, the mask generation circuitry left shifts the last bit mask pattern by the required number of bits. Comparison circuitry can then apply the (shifted) last bit mask to the first product significand, before the first product significand is itself shifted, to determine the last bit value at the last bit position. Hence, as in the cases above of the use of the rounding values and the overflow mask, the technique proposed herein with respect to the last bit mask allows an early determination of the last bit position (without waiting for the shift circuitry to perform its shift on the first and second product significands) and the overall speed of the multiplier is thus improved.

The mask generation circuitry for the last bit mask may be provided in a variety of ways, but in some embodiments the mask generation circuitry is arranged to generate a left-shift last bit mask and a right-shift last bit mask, wherein the comparison circuitry is responsive to the shift direction being a left direction to extract the last bit value using the left-shift last bit mask and is responsive to the shift direction being a right direction to extract the last bit value using the right-shift last bit mask. Thus, whilst it would in principle be possible only to generate the last bit mask as appropriate to the shift direction required once the shift direction and amount are established, the present techniques adopted agree a parallelisation by generating both a left shift last bit mask and a right shift last bit mask in parallel with one another and selecting between them in dependence on the shift direction when determined. This further increases the opportunity to reduce the time required for the result to be generated by the apparatus, since these left shift and right shift last bit masks can be prepared in advance.

As discussed above, the bit positions of the product significands also vary in dependence on whether the product significand has overflowed or not. This in consequence also affects the bit position of the last bit of the product significand. The apparatus could be configured to handle this in a number of ways, but in some embodiments the mask generation circuitry is arranged to generate two left-shift last bit masks, wherein the mask generation circuitry is arranged to generate a second left-shift last bit mask by right shifting by one bit a first left-shift last bit mask, and the comparison circuitry is arranged to apply the first left-shift last bit mask to the first product significand and to apply the second left-shift last bit mask to the second product significand, and the comparison circuitry is responsive to the overflow value indicating an overflow of the second product significand to select the last bit value extracted using the first left-shift last bit mask and is responsive to the overflow value indicating no overflow of the second product significand to select the last bit value extracted using the second left-shift last bit mask.

The present techniques recognise that a last bit mask generated for a left shift of the product significand (where it is recognised that it is usually a left shift of the product significand which may generate overflow), which is appropriate to use to identify the last bit in the case of overflow, can be generated from a last bit mask appropriate to identify the last bit when there is no overflow, and vice versa, by a one-bit shift being applied to generate one from the other. Further, as mentioned above such masks can be generated in advance of the significand shift circuitry applying the required shift to the product significands and therefore this feature of the multiplication is not delayed waiting for that shift to happen and the overall processing speed of the multiplier is thus improved.

In some embodiments the predetermined last bit mask pattern comprises, when the shift direction is the left direction, an unset bit followed by a predetermined number of set bits, wherein the predetermined number of set bits is one more than a number of bits of the formatted significand in the predetermined canonical format, and the mask generation circuitry is arranged to generate the first left-shift last bit mask from a base shifted mask generated by right shifting the predetermined last bit mask pattern by the shift amount and prepending the right shifted predetermined last bit mask pattern with a number of unset bits given by the shift amount. Whilst the predetermined last bit mask pattern (which used to generate the base shifted mask, from which the last bit position can readily be identified) could be defined in a number of ways, this configuration of an unset bit followed by set bits as defined above presents a bit pattern, after the shift has been applied, which usefully has unset bits (e.g. zeros) up to and including the last bit, and set bits (e.g. ones) thereafter. For example in the case of producing the product of two 24-bit significands, resulting in a 48 or 49 bit product, this may then be a zero bit followed by 24 consecutive ones. When this bit pattern is right shifted, zeros fill in on the left. This particular configuration is not only useful for identifying the last bit position itself, but further to identified guard and sticky bit positions which can also be required for the rounding correction, in dependence on the rounding mode being applied. This is particularly the case because the shifted pattern can then easily be used to construct masks to pick out individually these last, guard and sticky bit positions.

Similarly, in some embodiments the predetermined last bit mask pattern comprises, when the shift direction is the right direction, a sequence of unset bits followed by a predetermined number of set bits, wherein the predetermined number of set bits is the number of bits of the formatted significand in the predetermined canonical format, and the mask generation circuitry is arranged to generate the right-shift last bit mask from a base shifted mask generated by left shifting the predetermined last bit mask pattern by the shift amount and appending the left shifted predetermined last bit mask pattern with a number of set bits given by the shift amount. In this instance, the particular unshifted pattern which has been found to be useful is a sequence of unset bits (e.g. zeros) followed by a sequence of set bits (e.g. ones). For example in the case of producing the product of two 24-bit significands resulting in a 48 or 49-bit product, this may then be 26 consecutive zeros followed by 23 consecutive ones. When this bit pattern is left shifted, additional ones fill in on the right. Similarly, this enables not only the last bit position to be readily identified, but enables the guard and sticky bit positions to be readily identified too, through the use of further masks which may be generated from this shifted right shift bit mask.

As mentioned above, it may be required to identify a guard bit within the result significand and thus in some embodiments the mask generation circuitry is arranged to generate a guard bit mask, wherein the guard bit mask has a bit set at a guard bit position which is one position below the position of the last bit of the formatted significand within the first product significand, and the comparison circuitry is arranged to apply the guard bit mask to the first product significand to extract a guard bit value at the guard bit position. The guard bit mask may for example be generated by inverting the last bit mask and then performing a bit-wise AND on this inverted last bit mask and the un-inverted last bit mask where the alignment of bits in each is selected such that the resulting output will usefully simply have a set bit (e.g. a one) where the guard bit is located and zeros elsewhere. Moreover, the present techniques further recognise that a further guard bit mask for the second product significand can be derived from this guard bit mask by applying a one-bit right shift. Equally, the present techniques also recognise that a still further guard bit mask for a right shifted second product significand can be produced by the same process of inverting a right shift last bit mask, aligning the two with a one-bit offset, and performing a bit-wise AND.

Similarly in some embodiments the mask generation circuitry is arranged to generate a sticky bit mask, wherein the sticky bit mask has bits set at all bit positions below the guard bit position, and the comparison circuitry is arranged to apply the sticky bit mask to the first product significand to extract a set of sticky bit values and to calculate an overall sticky bit value as a logical OR of the set of sticky bit values. Thus, the sticky bit (or more usually the multiple sticky bits) of the first product significand can then be identified by the use of this sticky bit mask and the overall sticky bit value can then be calculated. The sticky bit mask may for example be generated from the predetermined last bit mask pattern by appropriate bit selection therefrom, excluding last and guard bits, for example where the predetermined mask pattern has set bits for all sticky bit positions. The present techniques ensure that these sticky bits are correctly identified in the first product significand by the opposite shift being applied and the sticky bit mask can then directly identify all those sticky bit positions and the overall S value can be calculated.

As mentioned above, depending on the rounding mode, some corrections to the values of L and G may be required and accordingly in some embodiments the apparatus further comprises correction circuitry responsive to the rounding mode of the apparatus being round-to-nearest ties-to-even (RNE) to calculate a corrected guard bit value as an inverse of the guard bit value and to calculate a corrected last bit value as the last bit value logical ANDed with a logical OR of the guard bit value and the overall sticky bit value. Thus, when in the RNE rounding mode, the appropriate corrections may be made.

It may further be the case that it is required for various exception flags to be generated by the apparatus in order to indicate various conditions which may arise as part of the floating-point multiplication. One of these is inexact detection for the multiplication, for which the present techniques provide a novel approach, wherein in one embodiment the apparatus further comprises inexact detection circuitry which is responsive to a rounding mode of the apparatus not being round-up (RU) to generate an inexact flag when the corrected guard bit value or the overall sticky value are non-zero. Similarly, in some embodiments the apparatus further comprises inexact detection circuitry which is responsive to a rounding mode of the apparatus being round-up (RU) to set an inexact flag, when the overflow value is set, when the first rounding value is not bit-identical with a corresponding lower portion of the first product significand, and which is responsive to the rounding mode of the apparatus being round-up (RU) to set the inexact flag, when the overflow value is not set, when the second rounding value is not bit-identical with a corresponding lower portion of the second product significand. In other words the technique, used in RU mode, is to examine the lower bits of the product (the bits that have contributed to G and S) and to compare them to the rounding injection. If these bits haven't changed then the rounding injection didn't change the product, and the result is exact.

Further, in some embodiments the apparatus comprises underflow detection circuitry to set an underflow flag when the formatted significand is zero and a biased exponent of the result of the multiplication is one and an inexact flag is set. The provision of this underflow detection circuitry is useful because the methodology for carrying out the floating-point multiplication may define that underflow should be detected before rounding, and with the above discussed early injection rounding techniques there is no pre-rounded product. The problematic case is a rounding injection that changes a sub-normal product to the minimum normal product, and in this case the fraction is all zeros and the biased exponent has changed from zero to one. The underflow detection circuitry can thus detect this case by determining if the formatted significand is zero and the biased exponent is one, and further seeing if the result is exact. If the result is inexact, then the rounding caused the overflow into normal numbers, and the underflow flag is then set, even though the result of the multiplication will in fact be normal.

Further, in some embodiments the apparatus comprises flush-to-zero flag generation circuitry to set a flush-to-zero flag when a biased exponent of the result of the multiplication is zero and either the exponent does not overflow or the exponent overflows due to rounding. A similar principle as applied above for detecting overflow is also applied to determining when to flush-to-zero, in that the flush-to-zero flag is set if the exponent is zero and either (i) the exponent does not overflow, or (ii) the exponent overflows due to rounding.

At least some embodiments provide apparatus for floating-point multiplication comprising: means for multiplying significands of a first floating-point operand and a second floating-point operand to generate first and second partial products; means for calculating a value of an unbiased exponent of a result of the multiplication in dependence on exponent values and leading zero counts of the first and second floating-point operands and for determining a shift amount and a shift direction for a product significand generated by an addition operation on the first and second partial products, in dependence on a predetermined minimum exponent value of a predetermined canonical format; means for generating first and second rounding values for injection into the addition operation, wherein the means for generating first and second rounding values comprises means for generating the first rounding value by shifting a predetermined rounding pattern by the shift amount in an opposite direction to the shift direction and means for generating the second rounding value by left shifting by one bit the first rounding value; means for adding the first and second partial products together with the first rounding value for the addition operation to generate a first product significand; means for adding the first and second partial products together with the second rounding value for the addition operation to generate a second product significand; means for shifting at least one of the first and second product significands by the shift amount in the shift direction; and means for selecting one of the first and second product significands in order to generate a formatted significand in the predetermined canonical format.

At least some embodiments provide a method of operating a data processing apparatus to perform floating-point multiplication comprising: multiplying significands of a first floating-point operand and a second floating-point operand to generate first and second partial products; calculating a value of an unbiased exponent of a result of the multiplication in dependence on exponent values and leading zero counts of the first and second floating-point operands and determining a shift amount and a shift direction for a product significand generated by an addition operation on the first and second partial products, in dependence on a predetermined minimum exponent value of a predetermined canonical format; generating first and second rounding values for injection into the addition operation, wherein generating the first and second rounding values comprises generating the first rounding value by shifting a predetermined rounding pattern by the shift amount in an opposite direction to the shift direction and generating the second rounding value by left shifting by one bit the first rounding value; adding the first and second partial products together with the first rounding value for the addition operation to generate a first product significand; adding the first and second partial products together with the second rounding value for the addition operation to generate a second product significand; shifting at least one of the first and second product significands by the shift amount in the shift direction; and selecting one of the first and second product significands in order to generate a formatted significand in the predetermined canonical format.

Some particular embodiments will now be described with reference to the figures.

Floating-point numbers comprise a sign bit, exponent bits and fraction bits. For example a single precision (SP) floating-point number in IEEE 754-2008 format is given by 32 bits where these comprise a single sign bit, 8 exponent bits and 23 fraction bits. When performing a multiplication between two such floating-point numbers, the fraction bits must be multiplied together, whilst the exponent bits are added, but of course the outcome of the fraction bit multiplication can require amendment to the result exponent in dependence on the particular format in which the result floating-point value should be presented. It is useful for the floating-point result value to be produced, in this example, in the canonical SP floating-point format, wherein the significand (fraction) product is normalised (where possible) or with a number of leading zeros if the product is subnormal.

When multiplying two normal significands, 1.a*1.b, the product can be in the range [1, 2) (i.e. from exactly 1 up to, but not including, 2) or [2, 4) (i.e. from exactly 2, up to but not including 4). For example, 1.00*1.01=1.0100, which is in [1, 2) and has not overflowed, and 1.10*1.10=10.1000, which is in [2, 4) and has overflowed.

FIG. 1A shows two possible bit position outcomes for the product of two normal 23-bit significands, where the product will either be in the range [1, 2) and bit 47 of the product will be 0, or the product will be in the overflow range [2, 4) and bit 47 of the product will be 1. The first bit of the product is labelled i (integer bit), and the next 22 bits are labelled f (fraction bits). The final fraction bit is labelled L (last bit), the bit following that is G (guard bit), and all remaining bits are labelled s (sticky bits). A single binary value S is defined to be the logical OR of all of the s bits. In other words, L is the least significant bit of the truncated value when this 47- or 48-bit product is returned as a 23-bit floating-point significand, G is the next most significant bit (i.e. the first bit not included in truncation) and S is the logical OR of all remaining bits that are not part of the truncation. These three values may be required to apply a correction to an injection rounded product significand, in dependence on the particular rounding mode being implemented, as will be described in further detail below.

FIG. 1B shows the bit positions of these named bits in the case where one of the input operands is subnormal, with k leading zeros. As can be seen in FIG. 1B there will be k leading zeros in non-overflow products and k–1 leading zeros in overflow products. Accordingly, it will be appreciated from FIGS. 1A and 1B, and the above description referring to these figures, that in a floating-point multiplier which accepts input operands which may be normalised or may be subnormal, the bit positions at which the above mentioned particular bits (i, f, L, G and s) occur can widely vary depending on the nature of the input operands (normal or subnormal) and depending on whether the product significand overflows. Note that the case in which both input operands are subnormal is trivial in the present context since this produces an unrepresentedly tiny product because the associated exponent (in this SP example) is –254 or less and the final result is determined purely by the rounding mode.

The above discussion referring to FIGS. 1A and 1B only considers the floating-point input operand significands and has not made reference to the exponents. Defining:
expa=unbiased exponent of operand a,
expb=unbiased exponent of operand b,
clza=number of leading zeros in the significand of a,
clzb=number of leading zeros in the significand of b.
and letting clz be the logical OR of clza and clzb, then the unbiased result exponent before shifting is result_exp=expa+expb–clz.

Based on this calculated result exponent, the 48-bit product significand may require shifting so that bits [47:0] represent the product in a canonical form, either normalised if the product is normal, or with the correct number of leading zeros if the product is subnormal. This shifting could be in either direction namely:
1) a right shift when result_exp is below the minimum unbiased exponent value of –126. In all such cases the product significand is right shifted by one or more places in order to reach the minimum unbiased exponent value of –126.
2) a left shift, when there is one subnormal input and result_exp is greater than –126. In this situation the product significand is shifted by zero or more places until either (whichever happens first) a) the exponent corresponding to the shifted value is equal to –126, or b) the product significand becomes normal (i.e. the i bit is in position 46).

FIG. 2 schematically illustrates a floating-point multiplier apparatus 10 in one embodiment. Operand "a" opa[31:0] (labelled 12) consists of sign bit signa, exponent bits expa [7:0], and fraction bits fraca[22:0], with a similar breakdown for operand "b" opb[31:0] (labelled 14). In the first stage (cycle) V1, fraca and fracb are multiplied together in a 23×23 array 16, after which the 23 partial products are reduced to two (48-bit) partial products using the 3:2 compressors 20 and 22.

While the reduction is proceeding, exponent calculation circuitry (shown as part of component 24) examines expa and expb to see if they are non-zero. Non-zero expa means that the implied integer bit of a is set, and in this case the exponent calculation circuitry 24 signals to the reduction array (part 18) that another factor of fracb is to be added into the reduction. Similarly non-zero expb means that the implied integer bit of b is set, and so in this event another factor of fraca is added into the reduction. Finally, a single bit corresponding to the product of the implied integer bits is added into the reduction array 18. While the array reduction proceeds, a count leading zero (CLZ) operation is also performed by the exponent calculation circuitry on the significands of opa and opb, and the product exponent, shift amount and direction (described later) are computed. Rounding injection circuitry (also shown as part of component 24 in this figure) constructs two rounding constants for injection rounding. Note that (for the reasons given above with respect to FIGS. 1A and 1B) it is at this stage not known where the leading bit of the product significand will be, although it can be computed to within one bit position, and for this reason a rounding constant for each of two candidate product significands are generated. The rounding constants (ovfl_round and round) are added to the partial products using 3:2 carry-sum-adders (CSA) 20 and 22 and then the two candidate product significands (ovfl_prod[47:0] and prod[48:0]) are produced by 48- and 49-bit adders 24 and 26. The sum of the partial products will always fit in 48 bits, although the rounding term could cause a carry into a 49$^{th}$ bit in some cases.

In the second stage (cycle) V2, the two candidate product significands held in registers 28 and 30 are left or right shifted by the shifters 32, 34 and 36, based on the left shift amount (ls[4:0]) 38 and right shift amount (rs[4:0]) 40 determined by the exponent calculation circuitry. A final exponent for each of the shifted results is produced and finally the multiplexer 42 selects between four possibilities, namely the left-shifted overflow significand (ovfl_prod), the left-shifted non-overflow significand (prod), the right-shifted non-overflow significand (prod) or special values, in dependence on the shift direction (rs/ls) signal received from the exponent calculation circuitry 20, an overflow flag and a special flag. A predefined special value is selected when a particular defined output is determined to be required (such a NaN, an infinity, or zero). The significand is output in the canonical 23-bit SP format, unless the multiply is part of a fused multiply-add (FMA) in which case the two rounding constants will have been overridden (so that in effect no rounding injection occurs) and the full 47 bits of fraction are forwarded.

Also in the second stage (cycle) V2, the comparison circuitry 44 and 46 uses masks constructed by mask generation circuitry (forming part of component 24 in this figure) to detect overflow on left-shifted significands and to determine rounding corrections and exception flag masks for left and right shifted significands. These generated masks are applied directly to the candidate product significands before the candidate product significands are shifted by the left and right shifters 32, 34 and 36.

The overview of the floating-point multiplier apparatus 10 shown in FIG. 2, with the cycle boundaries illustrated, allows an appreciation of the impact of the present techniques in that floating-point multiplication with injection rounding is provided which results in a fully rounded result (or the multiply part of a fused multiply-add) which can be performed in less than two cycles, in fact requiring only 1.5 cycles. Note that even a half-cycle speed-up is useful, since it allows for zero cycle forwarding.

Figure 3:
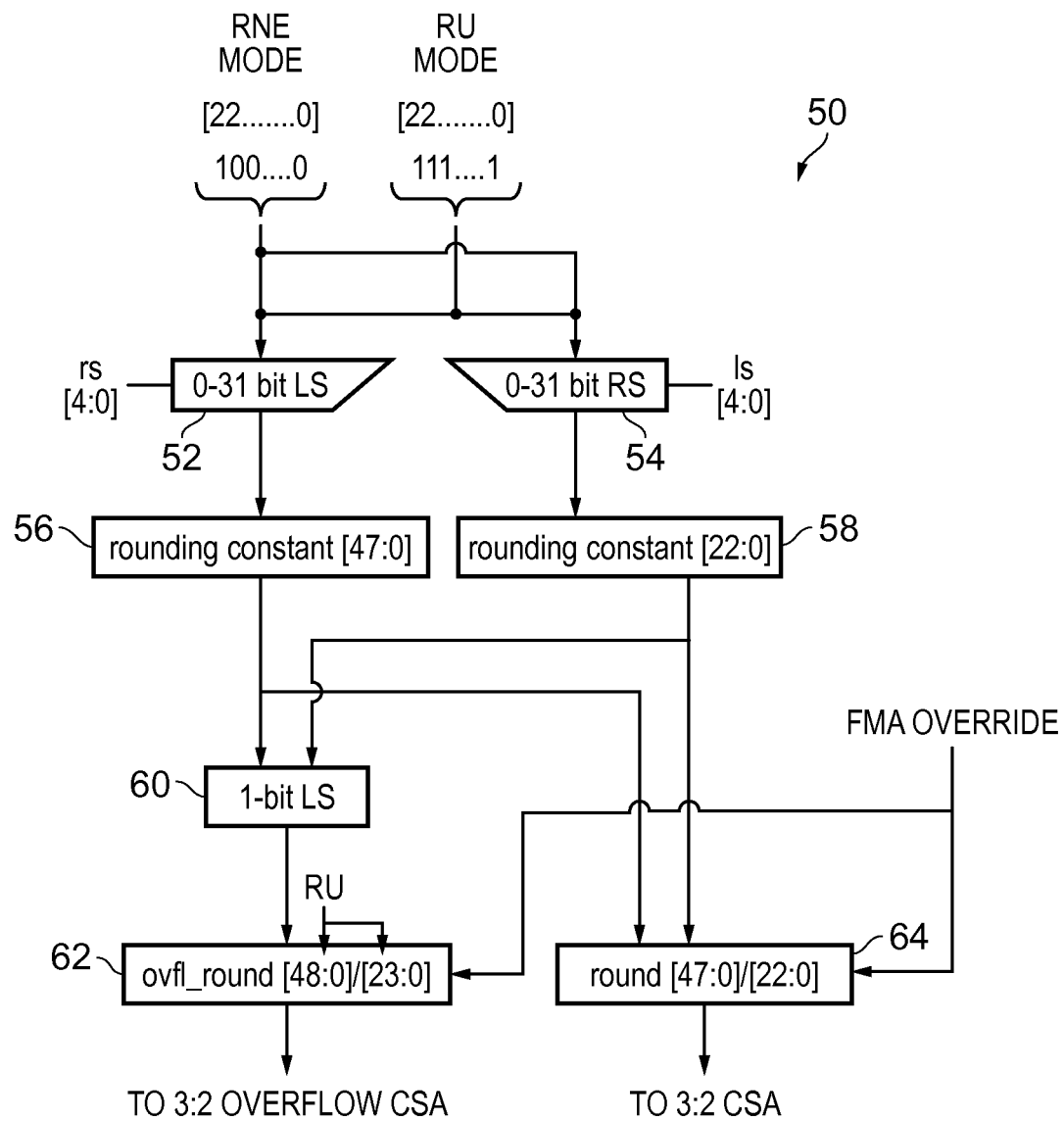
FIG. 3 schematically illustrates rounding injection circuitry in one embodiment.

FIG. 3 schematically illustrates rounding injection circuitry 50 in one embodiment. The rounding constant begins as a one followed by 22 zeros (for RNE rounding) or by 22 ones (for RU rounding). This base rounding pattern is then left shifted by left shifter 52 by the right shift amount determined by the exponent calculation circuitry and is right shifted by the right shift circuitry 54 by the left shift amount determined by the exponent calculation circuitry. The left and right shift amounts here are 5-bit values, so these shifts can be anywhere from 0 to 31 bit positions. The left shifted rounding constant 56, where bits appearing on the right are populated by ones if in RU mode, thus ends up as a 48-bit value. The right shifted rounding constant 58 has bits on the left replaced by zeros and thus remains a 23-bit value. Both left and right shift rounding values are generated, but only the appropriate one is used, determined by the left shift (ls) or right shift (rs) signal generated by the exponent calculation circuitry. The rounding constant thus generated is correct for the "prod" adder 26 in FIG. 2, whilst for the "ovfl_prod" adder 24 in FIG. 2 the rounding constant is left shifted one bit by one bit left shifter 60, with an RU bit (i.e. one when in RU mode) filling in the low order bit. The two rounding constants ovfl_round 62 and round 64 are then added to the partial products using the respective 3:2 CSAs 20 and 22 in FIG. 2. Note that FIG. 3 also shows a fused multiply-add (FMA) override signal which causes the two rounding constants to be set to zero so that no injection rounding occurs when the multiply operation forms part of a fused multiply-add operation. Thus, having computed a base rounding injection (the injection that would apply to an unshifted significand) and then shifting it in the opposite direction and with the same magnitude of the subsequent significand shift, this allows the rounding injection to be added to the unshifted significand with the rounding occurring in the correct place.

Figure 4:
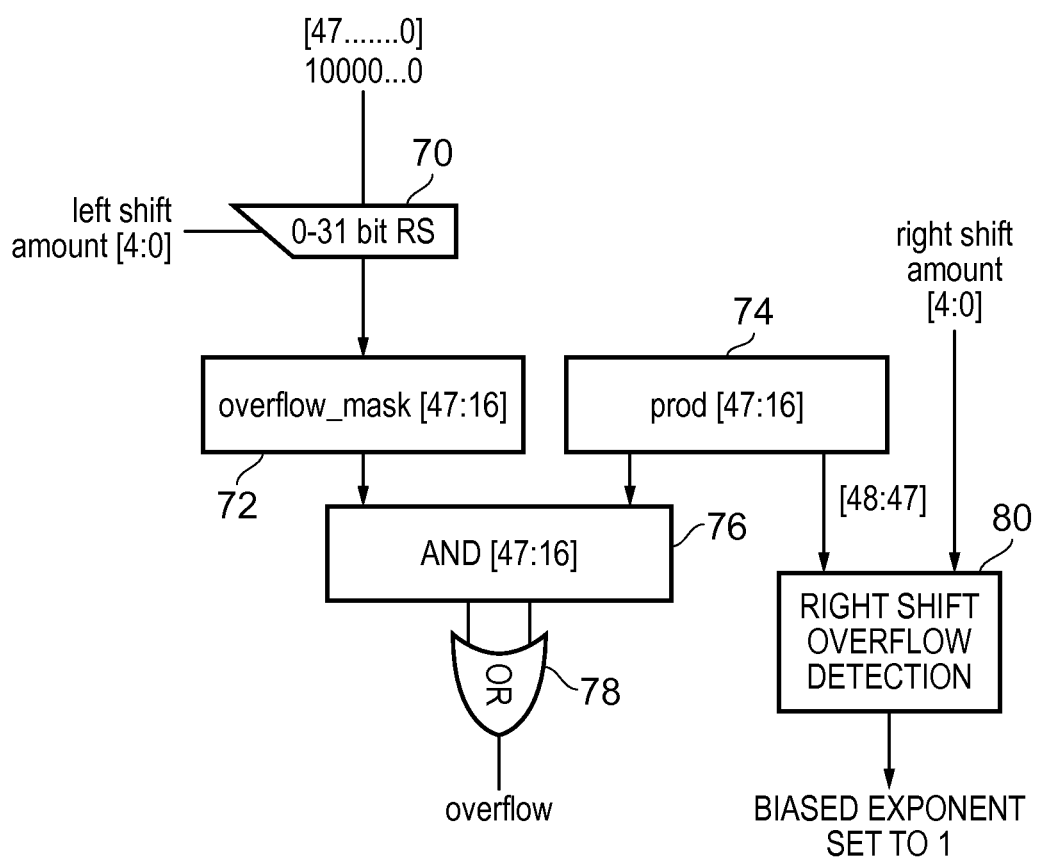
FIG. 4 schematically illustrates circuitry for determining whether an overflow of the product significand has occurred in one embodiment.

FIG. 4 schematically illustrates the overflow determination by a combination of the mask generation circuitry 24 and the comparison circuitry 46 in FIG. 2. The overflow mask is initially constructed consisting of a single 1 at position 47 and zeros in the remaining bits. The overflow mask is then right shifted (by right-shifter 70) by exactly the same amount that the product will be left shifted. This right shifting happens well before the 49-bit product significand is produced (by the adder 26), and the overflow is detected by a logical AND 76 of the mask 72 with the product 74, followed by a reduction OR 78. This allows the detection of the overflow before the left shifting of the candidate significand products (by the left shifters 32 and 34) has completed. A Verilog-like version of the FIG. 4 logical circuitry is:

ls_overflow=|(ovfl_mask[47:16] & prod[47:16]);

Notice that not all bits of the product prod are examined, because the maximum amount of left shifting is restricted to 31. FIG. 4 also shows right shift overflow detection circuitry 80, provided to detect the limited cases in which overflow can occur in a right shifted product, namely when bit 47 of the injection rounded product is set and the right shift amount is 1, or when bit 48 of the injection rounded product is set and the shift amount is 2. In both of these cases, the right shift overflow detection circuitry sets the biased exponent to 1. All other right shifts have a biased exponent of zero.

There are three sets of masks for computing the last (L), guard (G) and sticky (S) values, the generation and use of which are now discussed with reference to FIGS. 5, 6, and 7, where the schematically illustrated circuitry corresponds to the mask generation circuitry 24 and the comparison circuitry 44 and 46 in FIG. 2.

Figure 5:
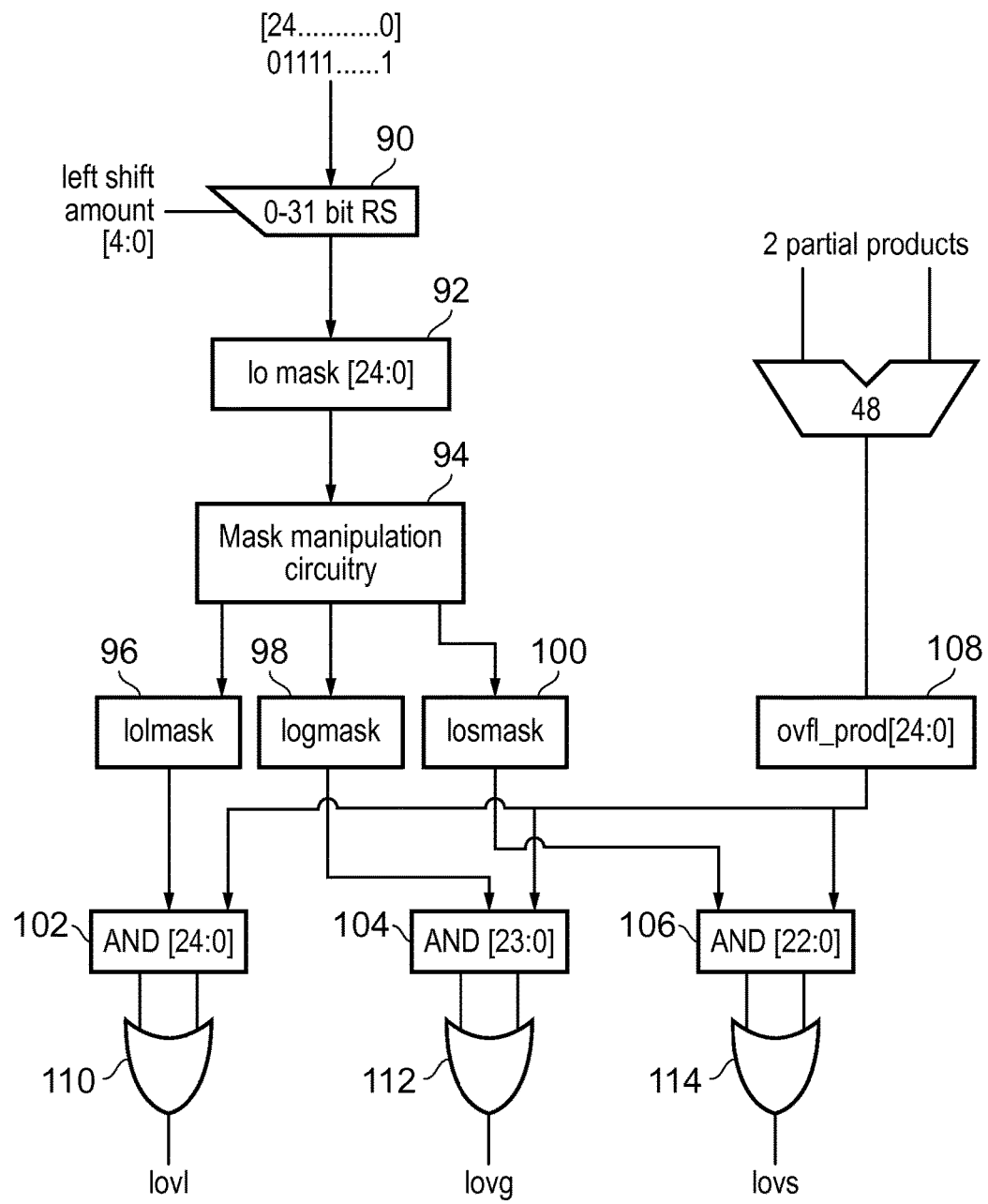
FIG. 5 schematically illustrates circuitry for the determination of last, guard and sticky bits used when the product significand is to be left shifted and overflows in one embodiment.
Figure 6:
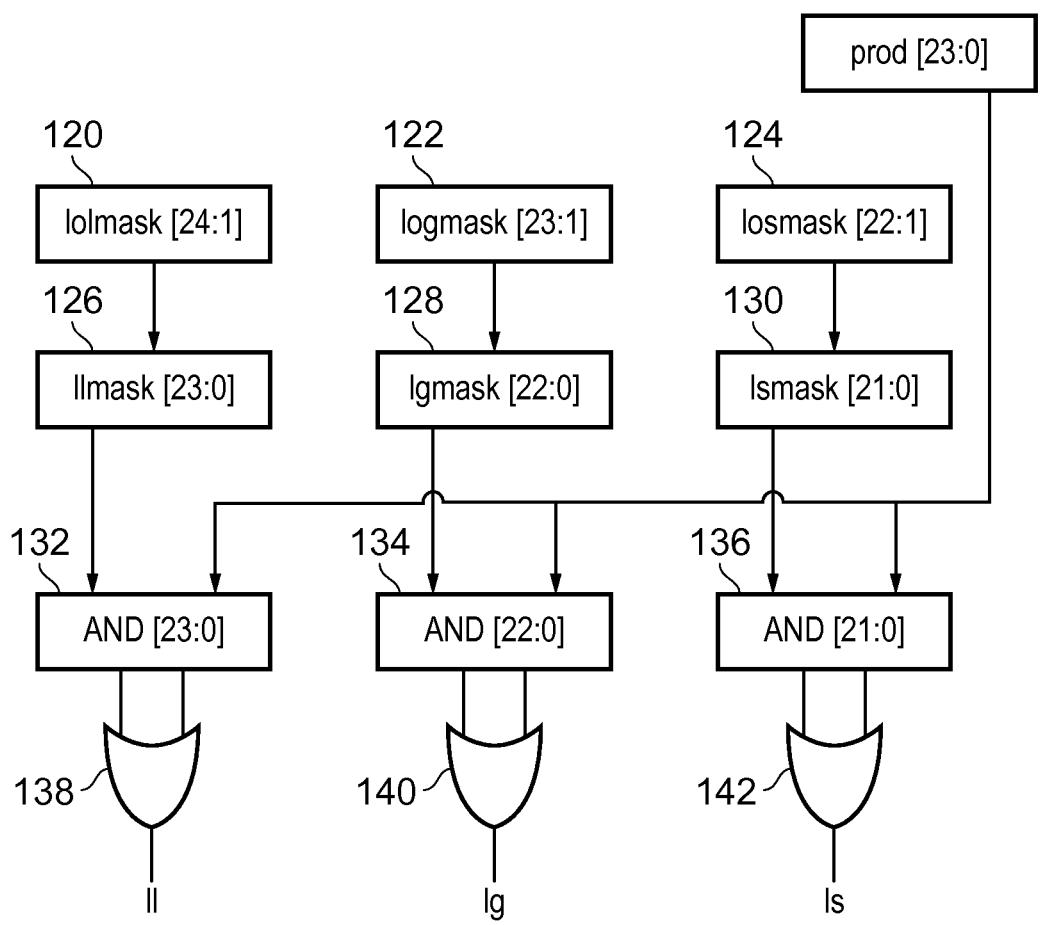
FIG. 6 schematically illustrates circuitry for determining the last, guard and sticky bits used when the product significand is to be left shifted and does not overflow in one embodiment.

FIG. 5 illustrates the left shift overflow case, where the initial mask pattern is initialized to a zero bit followed by 24 consecutive ones, and the mask is then right shifted (by right shifter 90) by the left shift amount, with zeros filling in on the left. This generates the 25-bit mask lomask[24:0] 92 that has zeros up to and including the L bit, and ones at the G and S positions. From this specific masks are constructed by the mask manipulation circuitry 94 to pick out L, G, and S. The corresponding Verilog-like versions of the logical circuitry implemented by the mask manipulation circuitry 94 are:

logmask[23:0]=~lomask[24:1] & lomask[23:0];

such that logmask 98 has a one where the G bit is located and zeros elsewhere;

lolmask[24:0]={logmask[23:0], 1'b0};

such that lolmask 96 has a one where the L bit is located and zeros elsewhere; and losmask[22:0]=lomask[22:0] & ~lolmask[22:0] & ~logmask[22:0];

such that losmask 100 has ones at every sticky bit position and zeros elsewhere.

Figure 7:
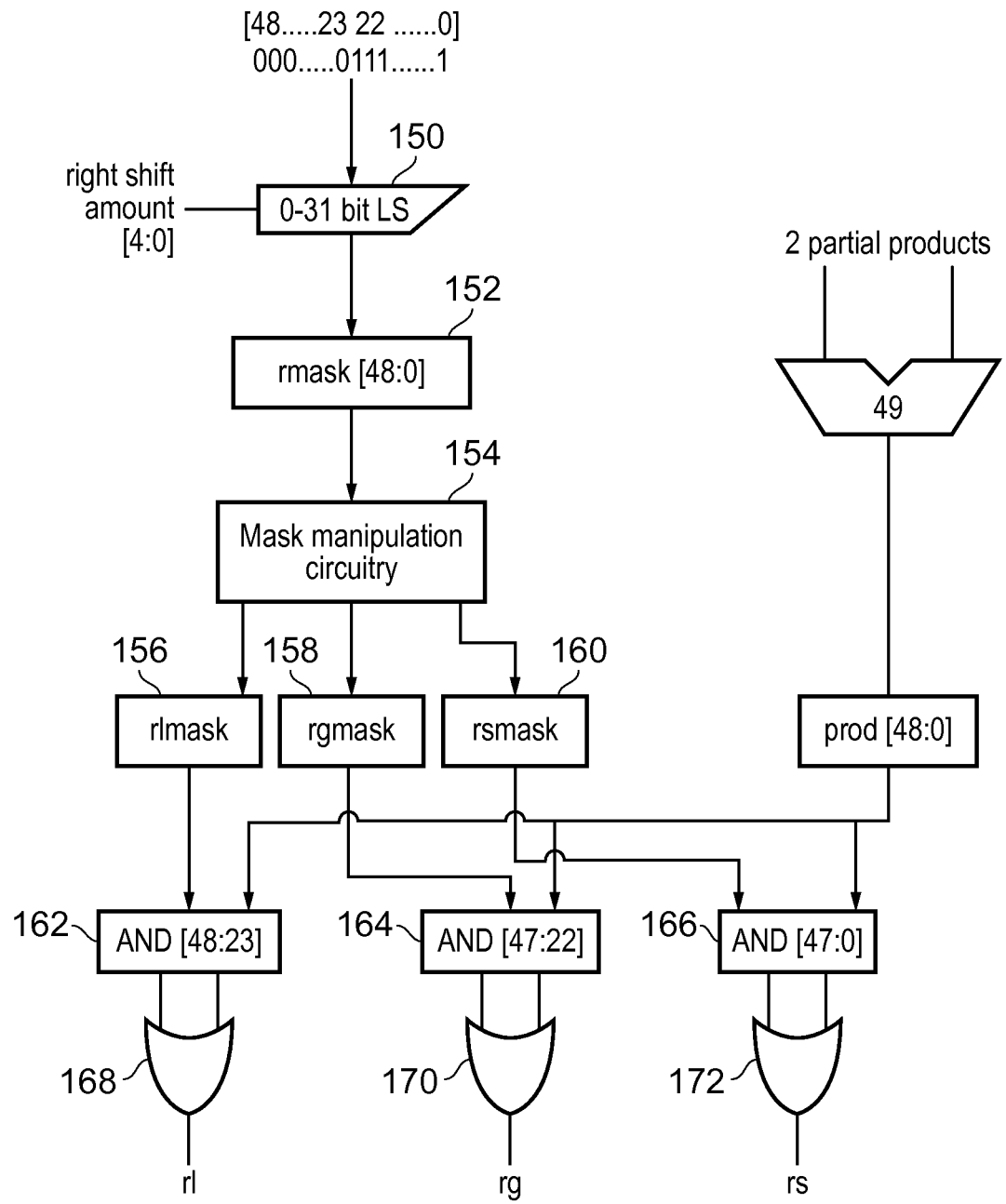
FIG. 7 schematically illustrates circuitry used to determine the last, guard and sticky bits when the product significand is to be right shifted in one embodiment.

These masks are applied directly by AND circuitry 102, 104 and 106 to the overflow product significand ovfl_prod 108 to get (from the OR gates 110, 112 and 114) L, G, and S for left-shifted overflow products. The corresponding Verilog-like versions are:

lovl=|(lolmask[24:0] & ovfl_prod[24:0]); // left overflow L lovg=|(logmask[23:0] & ovfl_prod[23:0]); // left overflow G lovs=|(losmask[22:0] & ovfl_prod[22:0]); // left overflow S The masks for the non-overflow left-shift cases are created from the left shift overflow masks shifted one bit more to the right. This is illustrated in FIG. 6, where it can be seen that the mask generation circuitry generates llmask 126, lgmask 128 and lsmask 130, this being done by shifting (bit selection of) the corresponding left shift overflow masks 120, 122, 124 according to the following Verilog-like descriptions:

llmask[23:0]=lolmask[24:1];

lgmask[22:0]=logmask[23:1];

lsmask[21:0]=losmask[22:1];

In the final stage, these masks are applied directly by AND circuitry 132, 134 and 136 to the non-overflow product prod to get (from the OR gates 138, 140 and 142) L, G, and S for left shifted non-overflow products. The corresponding Verilog-like versions are:

ll=|(llmask[23:0] & prod[23:0]); // left L lg=|(lgmask[22:0] & prod[22:0]); // left G ls=|(lsmask[21:0] & prod[21:0]); // left S FIG. 7 shows the construction and use of the right shift masks. The product is to be shifted right by a right shift amount, and to compute L. G, and S a mask is constructed that is left shifted by that same amount. The initial mask is 26 consecutive zeros followed by 23 consecutive ones, and this mask is left shifted (by left shifter 150) by the right shift amount, filling in additional ones on the right, yielding rmask[48:0] 152. From this specific masks 156, 158 and 160 are constructed by the mask manipulation circuitry 154 to pick out L, G, and S. The corresponding Verilog versions as implemented by the mask manipulation circuitry 154 are:

rgmask[47:22]=~rmask[48:23] & rmask[47:22];
rlmask[48:23]=rgmask[47:22];
rsmask[47:0]=rmask[48:1];
and L, G, and S are computed the same way as in the left shift cases by AND circuitry 162, 164 and 166 applying these masks to the non-overflow product prod to get (from the OR gates 168, 170 and 172) L. G, and S for right shifted products. The corresponding Verilog-like versions are:
rl=|(rmask[48:23] & prod[48:23]); // right L
rg=|(rgmask[47:22] & prod[47:22]); //right G
rs=|(rsmask[47:0] & prod[47:0]); // right S
In all of the above cases (shown in FIGS. 5-7) the base mask is constructed in V1, with specific masks for L, G and S produced at the beginning of V2. Since by this point it is known if the product significand is to be left or right shifted, and overflow has been determined, the appropriate L, G and S can simply be selected from the three computed versions.

Figure 8A:
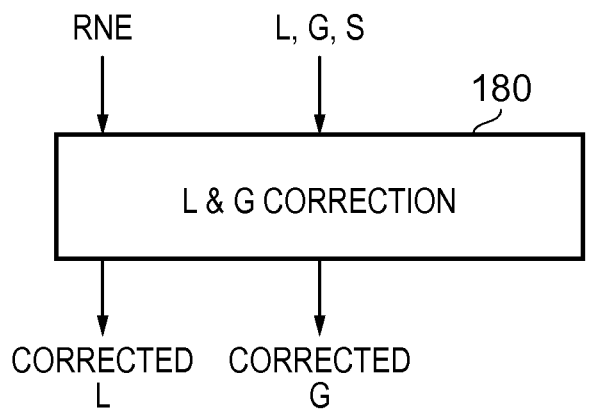
FIG. 8A schematically illustrates rounding correction circuitry used when applying RNE rounding in one embodiment.

FIG. 8A schematically illustrates correction circuitry 180 in one embodiment. This correction circuitry is provided because when applying RNE rounding, the values for L and G require a final correction. S remains unchanged. This is because a set bit has been injected at the G position, so the true G is the inverse of the computed G and L might have been changed by the injection as well. Given the values of L, G and S (after the injection), the corrected last bit of the rounded result ("corrected L") is given by L & (G|S).

Figure 8B:
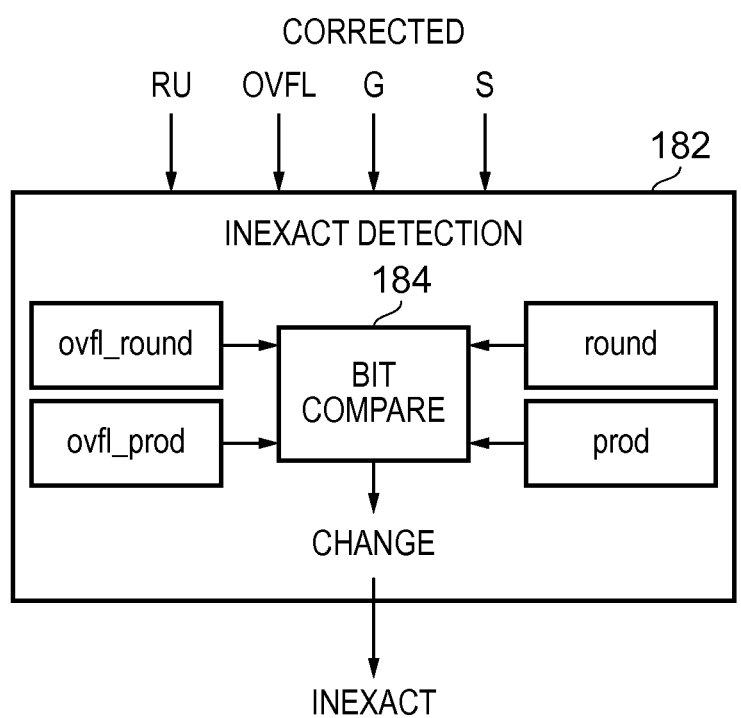
FIG. 8B schematically illustrates inexact detection circuitry used to detect if the result is exact or inexact in one embodiment.
Figure 9A:
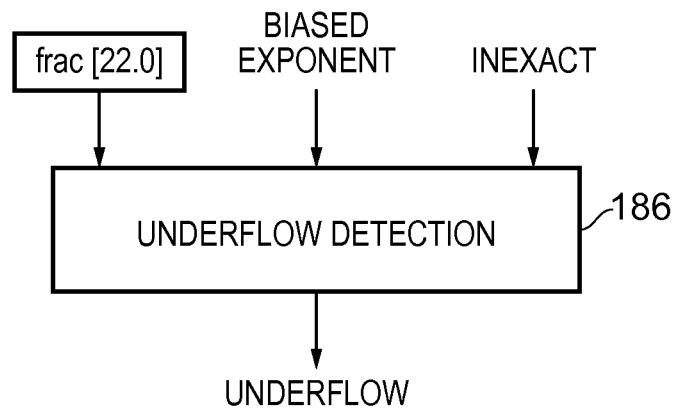
FIG. 9A schematically illustrates underflow detection circuitry in one embodiment.

FIG. 8B schematically illustrates circuitry for detecting an inexact result. The inexact detection circuitry 182 as shown in FIG. 8B, when the apparatus is performing rounding in RU mode, performs a bit comparison (using bit comparison circuitry 184) of the lower bits of the product (the bits that contribute to G and S) and compares them to the rounding injection. If these bits have not changed then the rounding injection did not change the product and the result is exact. The inexact detection circuitry 182 is arranged, for non-RU rounding modes, to set the inexact flag if the corrected G or S are non-zero. The corresponding Verilog-like version of the inexact detection circuitry 182 is:
ru_exact=&((prod[47:0] & round[47:0])|~round[47:0]);
oru_exact=&((ovfl_prod[47:0] & oround[47:0])|~oround [47:0]);
ixc_ru=(overflow & ~oru_exact)|(~overflow & ~ru_exact);

FIG. 9A schematically illustrates circuitry for underflow detection, which is used here because the methodology for the floating-point multiplication is defined such that underflow detection should occur before rounding, and of course with the early injection rounding there is no pre-rounded product. It is recognised here that the problematic case is a rounding injection that changes a sub-normal product to the minimum normal product, since in this case the fraction is all zeros and the biased exponent has changed from zero to one. Accordingly, the underflow detection circuitry 186 detects this type of underflow by examining the product fraction (which must be zero) and if this is the case and the biased exponent is one and the inexact flag is set then rounding caused the overflow into normal numbers, and the underflow (ufc) flag is set even though the final result will in fact be normal.

Figure 9B:
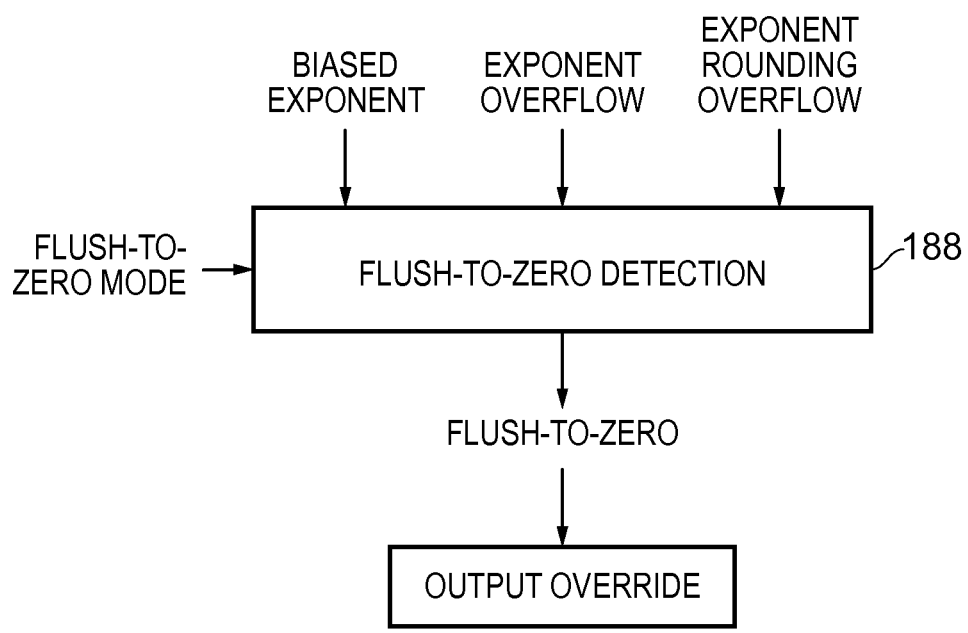
FIG. 9B schematically illustrates flush-to-zero detection circuitry in one embodiment.

FIG. 9B schematically illustrates flush-to-zero detection circuitry 188, which is provided in the apparatus such that when a flush-to-zero mode is enabled, results that are sub-normal before rounding are flushed to zero. A similar logic to that described above with respect to FIG. 9A for detecting underflow applies here, in that flush-to-zero occurs if the exponent is zero and either (i) the exponent does not overflow or (ii) the exponent overflows due to rounding. This flush-to-zero flag causes an output override wherein the output value is flushed to zero whatever its calculated value.

Figure 10A:
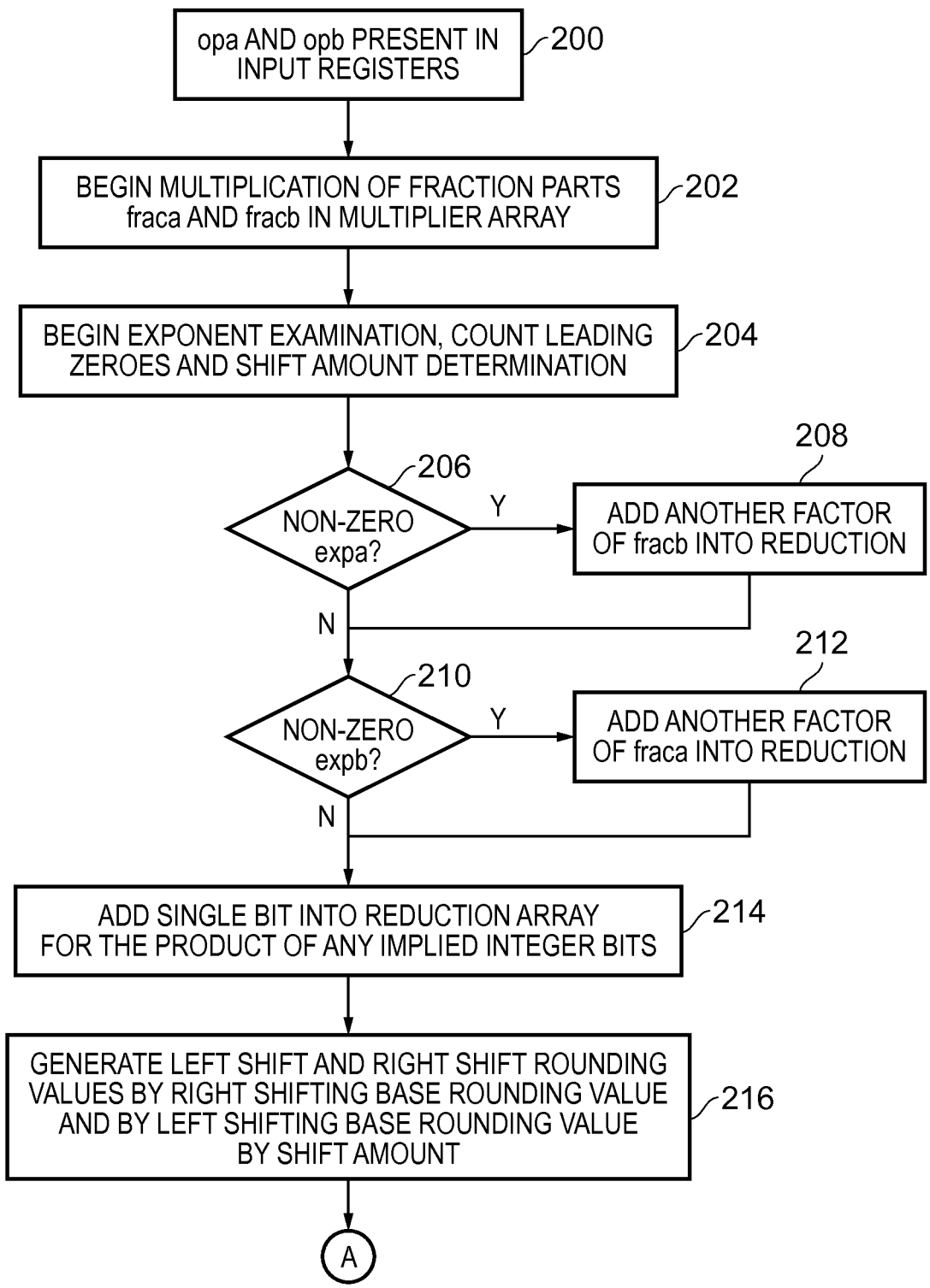
FIG. 10A-C show a sequence of steps which are taken when carrying out the method according to one embodiment.
Figure 10B:
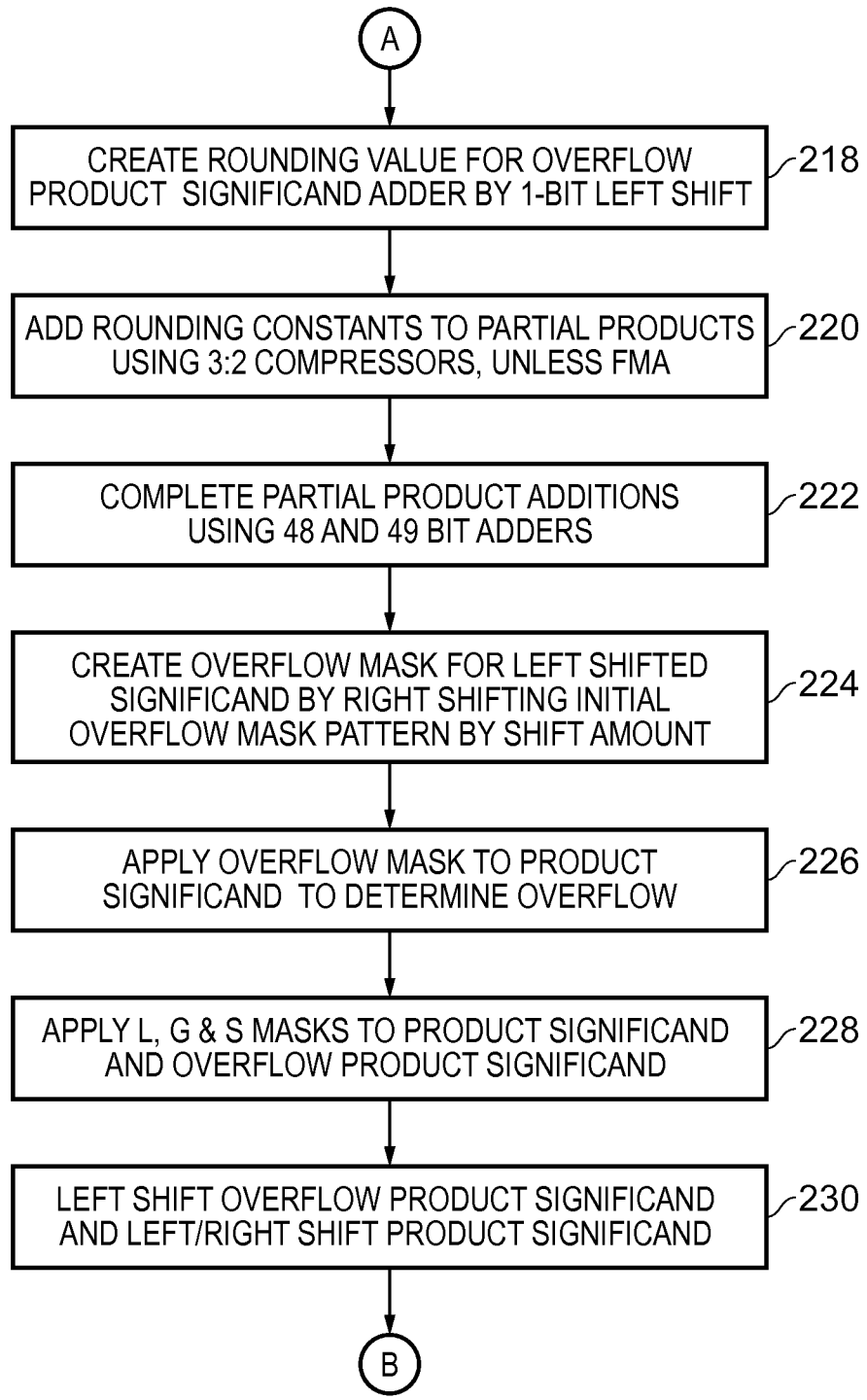
Figure 10C:
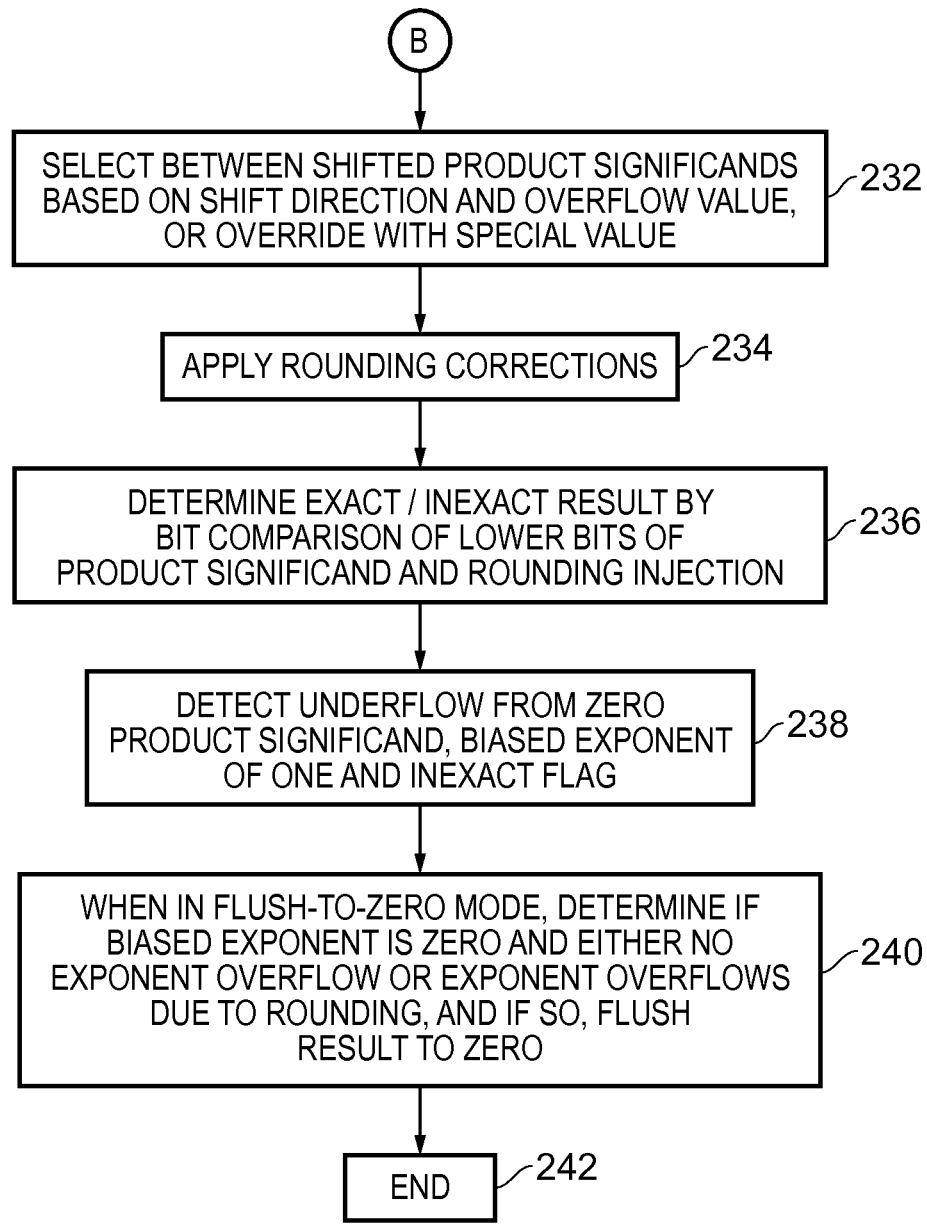

FIGS. 10A, 10B and 10C show a sequence of steps which are taken in the method of one embodiment. The flow can be considered to begin at step 200 where input operands opa and opb are present in the input registers. Then at step 202 multiplication of the fraction parts fraca and fracb begins in the multiplier array. At the same time (at step 204) examination of the exponent parts of the operands begins to determine the unbiased exponent of each operand and the leading zero count of each, such that a determination of the shift that will be required (both in amount and direction) can be made. At step 206 it is determined if opa has a non-zero exponent and if it does then the flow proceeds via step 208 where another factor of fracb is added into the reduction array. Similarly, at step 210 it is determined if opb has a non-zero exponent and if it does then the flow proceeds via step 212, where another factor of fraca is added into the reduction array. Finally, at step 214 a single bit is added into the reduction array for the product of any implied integer bits. Then at step 216, based on the determined shift amount, left shift and right shift rounding values are generated by, respectively, right shifting and left shifting a base rounding value by the shift amount. Then at step 218 a rounding value for the overflow product significand adder is created by a one-bit left shift of the rounding constant. The two rounding constants are then added into the partial products using 3:2 compressors, unless the multiply operation is part of a fused multiply-add in which case the rounding constants are forced to be zero. Then at step 222 the partial product additions are completed using the respective 48 and 49 bit adders.

At step 224 an overflow mask is created for left shifted significands by right shifting an initial overflow mask pattern by the shift amount. Then at step 226 this overflow mask is applied to the non-overflow product significand to determine the overflow status. Then at step 228 the L, G and S masks are applied to the product significand and the overflow product significand in order to determine the values of these L, G and S bits in dependence on the shift direction and the overflow status. Then at step 230 the overflow product significand is left shifted and the non-overflow product significand is both left and right shifted by the respective shifters. Then at step 232 the product significand to be output is selected between the shifted product significands based on the shifted direction and overflow value, unless overridden by a special value. At step 234 any necessary rounding corrections are applied based on the rounding mode and then at step 236 inexact detection is carried out by a bit comparison of the lower bits of the product significand and its rounding injection. At step 238 underflow is detected from a zero product significand, a biased exponent of one and the inexact flag being set. Finally at step 240 if the apparatus is in flush-to-zero mode then a flush-to-zero is carried out if the biased exponent is zero and either there is no exponent overflow or the exponent overflow is due to rounding. The flow ends at step 242.

By way of brief overall summary, the present techniques provide an apparatus and method for floating-point multiplication are provided. Two partial products are generated from two operand significands. An unbiased result exponent is determined from operand exponent values and leading zero counts, and a shift amount and direction for a product significand as needed for a predetermined minimum exponent value of a predetermined canonical format. First and second rounding values for injection into addition of the partial products are generated by shifting a predetermined rounding pattern by the shift amount in an opposite shift direction for the first rounding value and left shifting by one bit the first rounding value to give the second. The first and second partial products are added together with the first rounding value to give a first product significand, and are added together with the second rounding value to give a second product significand. These product significands are shifted by the shift amount in the shift direction and one is then selected in order to generate a formatted significand in the predetermined canonical format. The early injection rounding provides a faster floating-point multiplier.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus for floating-point multiplication comprising:
   partial product generation circuitry to multiply significands of a first floating-point operand and a second floating-point operand to generate first and second partial products;
   exponent calculation circuitry to calculate a value of an unbiased exponent of a result of the multiplication in dependence on exponent values and leading zero counts of the first and second floating-point operands and to determine a shift amount and a shift direction for a product significand generated by an addition operation on the first and second partial products, in dependence on a predetermined minimum exponent value of a predetermined canonical format;
   rounding injection circuitry to generate first and second rounding values for injection into the addition operation, wherein the rounding injection circuitry comprises rounding shift circuitry to generate the first rounding value by shifting a predetermined rounding pattern by the shift amount in an opposite direction to the shift direction and to generate the second rounding value by left shifting by one bit the first rounding value;
   first adder circuitry to add the first and second partial products together with the first rounding value for the addition operation to generate a first product significand;
   second adder circuitry to add the first and second partial products together with the second rounding value for the addition operation to generate a second product significand;
   significand shift circuitry to shift at least one of the first and second product significands by the shift amount in the shift direction; and
   selection circuitry to select one of the first and second product significands in order to generate a formatted significand in the predetermined canonical format.

2. The apparatus as claimed in claim 1, wherein the first adder circuitry has a configuration to generate the first product significand with one less bit than the second product significand generated by the second adder circuitry.

3. The apparatus as claimed in claim 1, wherein the predetermined rounding pattern has a length matching the formatted significand, and comprises a set bit followed by unset bits when a rounding mode of the apparatus is round-to-nearest ties-to-even (RNE), and comprises all set bits when the rounding mode is round-up (RU), and
   when the opposite direction is left and the rounding mode is round-up, a number of less-significant bit positions are set given by the shift amount, and
   when the opposite direction is right, a number of most-significant bit positions are unset given by the shift amount.

4. The apparatus as claimed in claim 1, comprising mask generation circuitry to generate an overflow mask identifying an overflow bit position of the second product significand, wherein the mask generation circuitry is arranged to generate the overflow mask by right shifting a predetermined mask pattern by the shift amount; and
   comparison circuitry to apply the overflow mask to the second product significand to extract an overflow value at the overflow bit position, wherein the comparison circuitry is arranged to extract the overflow value before the significand shift circuitry shifts at least one of the first and second product significands.

5. The apparatus as claimed in claim 4, wherein the predetermined mask pattern comprises a set bit at an unshifted overflow bit position of the second product significand when the second product significand is unshifted.

6. The apparatus as claimed in claim 1, wherein the exponent calculation circuitry comprises right shift overflow determination circuitry to identify a right shift overflow condition when the shift direction is right, and either:
   a most significant bit of the second product significand is set and the shift amount is two; or
   a most-significant-but-one bit of the second product significand is set and the shift amount is one; and
   the exponent calculation circuitry is responsive to the right shift overflow condition to set a value of a biased exponent of the result of the multiplication to one.

7. The apparatus as claimed in claim 4, wherein the significand shift circuitry comprises:
   left shift circuitry to left shift the first and second product significands by the shift amount to give first and second left-shifted product significands;
   right shift circuitry to right shift the second product significand by the shift amount to give a right-shifted product significand, wherein the left shift circuitry and the right shift circuitry are arranged to perform their respective shifting in parallel with one another; and
   the selection circuitry is responsive to the shift direction and the overflow value to select as the formatted significand one of the first left-shifted product significand, the second left-shifted product significand and the right-shifted product significand, and to select a predetermined number of most significant bits in the formatted significand to output.

8. The apparatus as claimed in claim 7, wherein the first and second rounding values are set to zero and the apparatus has a configuration to forward an unrounded result of the multiplication to an adder as part of a fused multiply-add.

9. The apparatus as claimed in claim 4, wherein the mask generation circuitry is arranged to generate a last bit mask identifying a last bit position of a last bit of the formatted significand within the first product significand and wherein the mask generation circuitry is arranged to generate the last bit mask comprising shifting a predetermined last bit mask pattern by the shift amount in an opposite direction to the shift direction, and further comprising:

comparison circuitry to apply the last bit mask to the first product significand to extract a last bit value at the last bit position.

10. The apparatus as claimed in claim 9, wherein the mask generation circuitry is arranged to generate a left-shift last bit mask and a right-shift last bit mask, wherein the comparison circuitry is responsive to the shift direction being a left direction to extract the last bit value using the left-shift last bit mask and is responsive to the shift direction being a right direction to extract the last bit value using the right-shift last bit mask.

11. The apparatus as claimed in claim 10, wherein the mask generation circuitry is arranged to generate two left-shift last bit masks, wherein the mask generation circuitry is arranged to generate a second left-shift last bit mask by right shifting by one bit a first left-shift last bit mask, and the comparison circuitry is arranged to apply the first left-shift last bit mask to the first product significand and to apply the second left-shift last bit mask to the second product significand, and the comparison circuitry is responsive to the overflow value indicating an overflow of the second product significand to select the last bit value extracted using the first left-shift last bit mask and is responsive to the overflow value indicating no overflow of the second product significand to select the last bit value extracted using the second left-shift last bit mask.

12. The apparatus as claimed in claim 11, wherein the predetermined last bit mask pattern comprises, when the shift direction is the left direction, an unset bit followed by a predetermined number of set bits, wherein the predetermined number of set bits is one more than a number of bits of the formatted significand in the predetermined canonical format, and the mask generation circuitry is arranged to generate the first left-shift last bit mask from a base shifted mask generated by right shifting the predetermined last bit mask pattern by the shift amount and prepending the right shifted predetermined last bit mask pattern with a number of unset bits given by the shift amount.

13. The apparatus as claimed in claim 10, wherein the predetermined last bit mask pattern comprises, when the shift direction is the right direction, a sequence of unset bits followed by a predetermined number of set bits, wherein the predetermined number of set bits is the number of bits of the formatted significand in the predetermined canonical format, and the mask generation circuitry is arranged to generate the right-shift last bit mask from a base shifted mask generated by left shifting the predetermined last bit mask pattern by the shift amount and appending the left shifted predetermined last bit mask pattern with a number of set bits given by the shift amount.

14. The apparatus as claimed in claim 9, wherein the mask generation circuitry is arranged to generate a guard bit mask, wherein the guard bit mask has a bit set at a guard bit position which is one position below the position of the last bit of the formatted significand within the first product significand, and the comparison circuitry is arranged to apply the guard bit mask to the first product significand to extract a guard bit value at the guard bit position.

15. The apparatus as claimed in claim 14, wherein the mask generation circuitry is arranged to generate a sticky bit mask, wherein the sticky bit mask has bits set at all bit positions below the guard bit position, and the comparison circuitry is arranged to apply the sticky bit mask to the first product significand to extract a set of sticky bit values and to calculate an overall sticky bit value as a logical OR of the set of sticky bit values.

16. The apparatus as claimed in claim 14, further comprising correction circuitry responsive to the rounding mode of the apparatus being round-to-nearest ties-to-even (RNE) to calculate a corrected guard bit value as an inverse of the guard bit value and to calculate a corrected last bit value as the last bit value logical ANDed with a logical OR of the guard bit value and the overall sticky bit value.

17. The apparatus as claimed in claim 16, further comprising inexact detection circuitry which is responsive to a rounding mode of the apparatus not being round-up (RU) to generate an inexact flag when the corrected guard bit value or the overall sticky value are non-zero.

18. The apparatus as claimed in claim 4, further comprising inexact detection circuitry which is responsive to a rounding mode of the apparatus being round-up (RU) to set an inexact flag, when the overflow value is set, when the first rounding value is not bit-identical with a corresponding lower portion of the first product significand, and which is responsive to the rounding mode of the apparatus being round-up (RU) to set the inexact flag, when the overflow value is not set, when the second rounding value is not bit-identical with a corresponding lower portion of the second product significand.

19. The apparatus as claimed in claim 1, further comprising underflow detection circuitry to set an underflow flag when the formatted significand is zero and a biased exponent of the result of the multiplication is one and an inexact flag is set.

20. The apparatus as claimed in claim 1, further comprising flush-to-zero flag generation circuitry to set a flush-to-zero flag when a biased exponent of the result of the multiplication is zero and either:

the exponent does not overflow, or the exponent overflows due to rounding.

21. A method of operating a data processing apparatus to perform floating-point multiplication comprising:

multiplying, by partial product generation circuitry, significands of a first floating-point operand and a second floating-point operand to generate first and second partial products;

calculating, by exponent calculation circuitry, a value of an unbiased exponent of a result of the multiplication in dependence on exponent values and leading zero counts of the first and second floating-point operands and determining a shift amount and a shift direction for a product significand generated by an addition operation on the first and second partial products, in dependence on a predetermined minimum exponent value of a predetermined canonical format;

generating, rounding injection circuitry, first and second rounding values for injection into the addition operation, wherein generating the first and second rounding values comprises generating the first rounding value by shifting a predetermined rounding pattern by the shift amount in an opposite direction to the shift direction and generating the second rounding value by left shifting by one bit the first rounding value;

adding, by adder circuitry, the first and second partial products together with the first rounding value for the addition operation to generate a first product significand;

adding, by adder circuitry, the first and second partial products together with the second rounding value for the addition operation to generate a second product significand;

shifting, by significand shift circuitry, at least one of the first and second product significands by the shift amount in the shift direction; and selecting, selection circuitry, one of the first and second product significands in order to generate a formatted significand in the predetermined canonical format.

\* \* \* \* \*